E. LAMBUR.
Smoke-Pipe Damper and Ventilator.
No. 221,075. Patented Oct. 28, 1879.
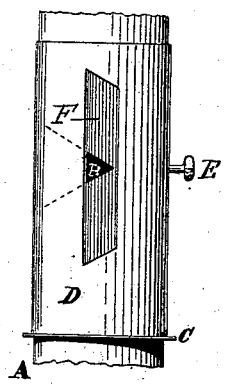
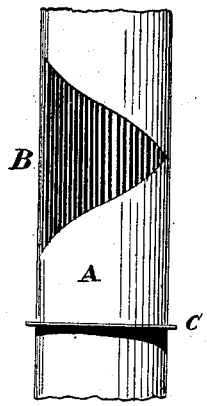 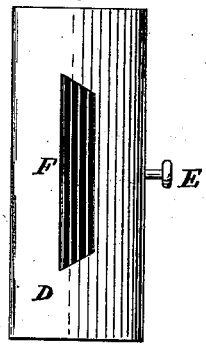
Attest
Walter Knight
G. L. Knight.
Inventor:
Edward Lambur
By Knight Bros. Attys.

UNITED STATES PATENT OFFICE.

EDWARD LAMBUR, OF CINCINNATI, OHIO, ASSIGNOR OF ONE-HALF OF HIS RIGHT TO GEO. H. KNIGHT, OF SAME PLACE.

IMPROVEMENT IN SMOKE-PIPE DAMPERS AND VENTILATORS.

Specification forming part of Letters Patent No. 221,075, dated October 28, 1879; application filed March 15, 1879.

*To all whom it may concern:*

Be it known that I, EDWARD LAMBUR, of Cincinnati, Hamilton county, Ohio, have invented a new and useful Smoke-Pipe Damper and Ventilator, of which the following is a specification.

My invention relates to an improved form of cylindrical gate or valve, in combination with a graduated opening in the pipe, to enable the attendant to lessen or moderate excessive draft in the pipe.

In the accompanying drawings, Figure 1 is a side view of my damper applied to a stove-pipe. Fig. 2 is a similar view of the stove-pipe, with the cylindrical damper removed; and Fig. 3 is a view of the damper.

A may represent any stove-pipe, of sheet metal, to which my damper is to be applied. A triangular orifice, B, is cut in the pipe, so as to have one side in line with the pipe, and a short distance below said orifice the pipe is provided with a collar, C, which serves to support the damper D.

The damper D is a cylindrical pipe, of slightly larger diameter than the pipe A, so as to fit closely around the outside of the same, and is provided with a knob or handle, E, by means of which the damper D may be rotated on the stove-pipe, so as to put the opening F in said damper in and out of communication with that in the stove-pipe A.

I am aware that a stove-pipe damper consisting of a sleeve having a circular opening, and adapted to be turned so as to bring said opening partially or wholly in register with an equal circular opening in the pipe, has before been used. This, therefore, I do not claim.

The distinctive peculiarity of my invention consists in providing one member with a parallel-sided opening, and the other with an opening converging toward one end, at any desirable angle.

The following are among the advantages in the above-specified improvement: The movement of the parallel-sided opening over the convergent-sided opening affords, when the opening is nearly closed, the greatest nicety of adjustment, and when, in opening the damper, the rear side of the vertical aperture has passed the apex of the triangular aperture, the continued movement of the sleeve, after covering the narrow extremity of the triangular opening, will cause a gradual and approximately uniform increase in area of the opening until its full capacity is reached.

Having thus described my invention, what I claim as new, and desire to secure by Letters Patent, is—

A damper consisting of two concentrically-curved members, one provided with a convergent-sided opening, and the other with an opening of less width in the direction of motion, substantially as and for the purposes set forth.

In testimony of which invention I hereunto set my hand.

EDWARD LAMBUR.

Attest:
GEO. H. KNIGHT,
L. H. BOND.